United States Patent
Shiogama et al.

(10) Patent No.: US 8,494,577 B2
(45) Date of Patent: Jul. 23, 2013

(54) ELECTRONIC DEVICE

(75) Inventors: Naoki Shiogama, Tokyo (JP);
Tomofumi Osako, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/501,002

(22) PCT Filed: Sep. 15, 2010

(86) PCT No.: PCT/JP2010/005620
§ 371 (c)(1),
(2), (4) Date: Apr. 9, 2012

(87) PCT Pub. No.: WO2011/045894
PCT Pub. Date: Apr. 21, 2011

(65) Prior Publication Data
US 2012/0202559 A1 Aug. 9, 2012

(30) Foreign Application Priority Data
Oct. 15, 2009 (JP) .................................. 2009-237823

(51) Int. Cl.
*H04R 1/02* (2006.01)
*H04M 1/00* (2006.01)

(52) U.S. Cl.
USPC .................... 455/550.1; 455/90.3; 455/575.1; 455/575.8

(58) Field of Classification Search
USPC .............. 455/550.1, 90.3, 575.1, 575.8, 66.1, 455/556.1, 557; 381/174, 355, 369
See application file for complete search history.

(56) References Cited

U.S. PATENT DOCUMENTS

| | | | | |
|---|---|---|---|---|
| 3,909,529 A * | 9/1975 | Morrow et al. | ............... | 381/355 |
| 5,138,666 A * | 8/1992 | Bauer et al. | ................... | 381/367 |
| 6,188,773 B1 * | 2/2001 | Murata et al. | ................. | 381/361 |
| 7,620,191 B2 * | 11/2009 | Tanabe et al. | ................. | 381/174 |
| 7,991,173 B2 * | 8/2011 | Ueki | ............................. | 381/174 |
| 8,150,082 B2 * | 4/2012 | Saito et al. | .................... | 381/322 |
| 2011/0013799 A1* | 1/2011 | Fang et al. | ..................... | 381/355 |

FOREIGN PATENT DOCUMENTS

| | | |
|---|---|---|
| JP | 2001-313990 | 11/2001 |
| JP | 2009-010234 | 1/2009 |
| JP | 2009-033248 | 2/2009 |

OTHER PUBLICATIONS

International Search Report, PCT/JP2010/005620, Oct. 12, 2010.

* cited by examiner

*Primary Examiner* — Pablo Tran
(74) *Attorney, Agent, or Firm* — Young & Thompson

(57) ABSTRACT

An electronic device 100 includes a signal converter 110 and a housing 120. The signal converter has a diaphragm 111 and, when one of an acoustic signal and an electric signal is inputted, converts the inputted signal into the other signal by the vibrations of the diaphragm. The housing is provided with an internal space SPD. The housing holds the signal converter in the internal space. The housing is provided with an opening 121. The housing has a bulkhead 122 dividing the internal space into plural division spaces including a first division space SPD1 and a second division space SPD2. The diaphragm configures at least part of a bulkhead forming the first division space. The housing is provided with a first communicating path that makes the first division space communicate with the opening, and a second communicating path that makes the second division space communicate with the opening.

20 Claims, 8 Drawing Sheets

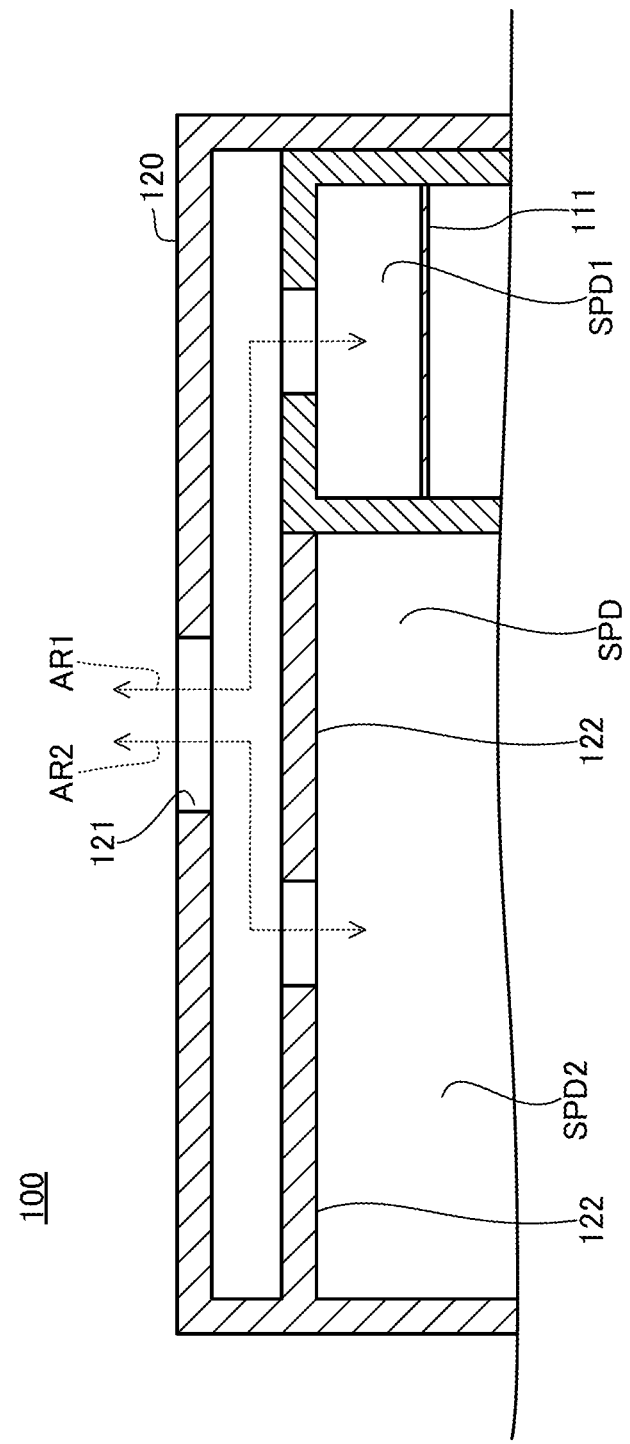

ELECTRONIC DEVICE

TECHNICAL FIELD

The present invention relates to an electronic device equipped with a signal converter converting one of an acoustic signal and an electric signal into the other.

BACKGROUND ART

There is a known electronic device equipped with a signal converter (a receiver, a speaker, or a microphone) having a diaphragm and, when one of an acoustic signal (an acoustic wave) and an electric signal is inputted, converting the inputted signal into the other signal by the vibrations of the diaphragm.

As one of this type of electronic devices, an electronic device described in Patent Document 1 is equipped with a housing in which an internal space is formed. The internal space is divided into a plurality of division spaces including a first division space and a second division space. A signal converter is held in the first internal space.

Further, the housing is provided with a plurality of openings that opens to the outside of the housing. In addition, the housing is provided with a first communicating path that makes the first division space communicate with a first opening, which is one of the openings, and a second communicating path that makes the second division space communicate with a second opening, which is another one of the plurality of openings.

An acoustic signal propagates between the signal converter and the outside of the housing through the first communicating path. Moreover, by the passing of the air through the second communicating path, regulation between the pressure inside the second division space and the pressure outside the housing is achieved.

[Patent Document 1] Japanese Unexamined Patent Application Publication No. 2009-33248

Thus, in the electronic device, the housing is provided with comparatively many openings. Therefore, there is a problem that the freedom of design of the housing decreases. Moreover, such a problem also occurs in a case that the first division space adjoining the front face of the diaphragm and the second division space adjoining the back face of the diaphragm are formed inside the housing.

SUMMARY

Accordingly, an object of the present invention is to provide an electronic device that can solve the problem mentioned above, "the freedom of design of a housing decreases."

In order to achieve the object, an electronic device of an exemplary embodiment of the present invention includes: a signal converter provided with a diaphragm and configured to, when one of an acoustic signal and an electric signal is inputted, convert the inputted signal into the other signal by vibrations of the diaphragm; and a housing provided with an internal space and configured to hold the signal converter in the internal space.

In the electronic device: the housing is provided with an opening configured to open to an outside of the housing; the housing has a bulkhead configured to divide the internal space into a plurality of division spaces including a first division space and a second division space; the diaphragm configures at least part of a bulkhead forming the first division space; and the housing is provided with a first communicating path configured to make the first division space and the opening communicate with each other and a second communicating path configured to make the second division space and the opening communicate with each other.

Further, a mobile phone of another exemplary embodiment of the present invention includes: a signal converter provided with a diaphragm and configured to, when one of an acoustic signal and an electric signal is inputted, convert the inputted signal into the other signal by vibrations of the diaphragm; and a housing provided with an internal space and configured to hold the signal converter in the internal space.

In the mobile phone: the housing is provided with an opening configured to open to an outside of the housing; the housing has a bulkhead configured to divide the internal space into a plurality of division spaces including a first division space and a second division space; the diaphragm configures at least part of a bulkhead forming the first division space; and the housing is provided with a first communicating path configured to make the first division space and the opening communicate with each other and a second communicating path configured to make the second division space and the opening communicate with each other.

Furthermore, a signal propagating method of another exemplary embodiment of the present invention is a method applied to an electronic device.

The electronic device includes: a signal converter provided with a diaphragm and configured to, when one of an acoustic signal and an electric signal is inputted, convert the inputted signal into the other signal by vibrations of the diaphragm; and a housing provided with an internal space and configured to hold the signal converter in the internal space.

The electronic device is configured so that: the housing has a bulkhead configured to divide the internal space into a plurality of division spaces including a first division space and a second division space; and the diaphragm configures at least part of a bulkhead forming the first division space.

The signal propagating method includes: performing propagation of the acoustic signal between the first division space and an outside of the housing through a first communicating path formed so as to make an opening formed so as to open to the outside of the housing and the first division space communicate with each other; and making air pass through a second communicating path formed so as to make the opening and the second division space communicate with each other.

With the configurations as described above, the present invention can increase the freedom of design of a housing.

BRIEF DESCRIPTION OF DRAWINGS

FIG. 8 is a cross-sectional view of an electronic device according to a fourth exemplary embodiment of the present invention.

EXEMPLARY EMBODIMENTS

Below, exemplary embodiments of an electronic device, a mobile phone and a signal propagating method according to the present invention will be described, respectively, with reference to FIGS. 1 to 8.

<First Exemplary Embodiment>

Figure 1:
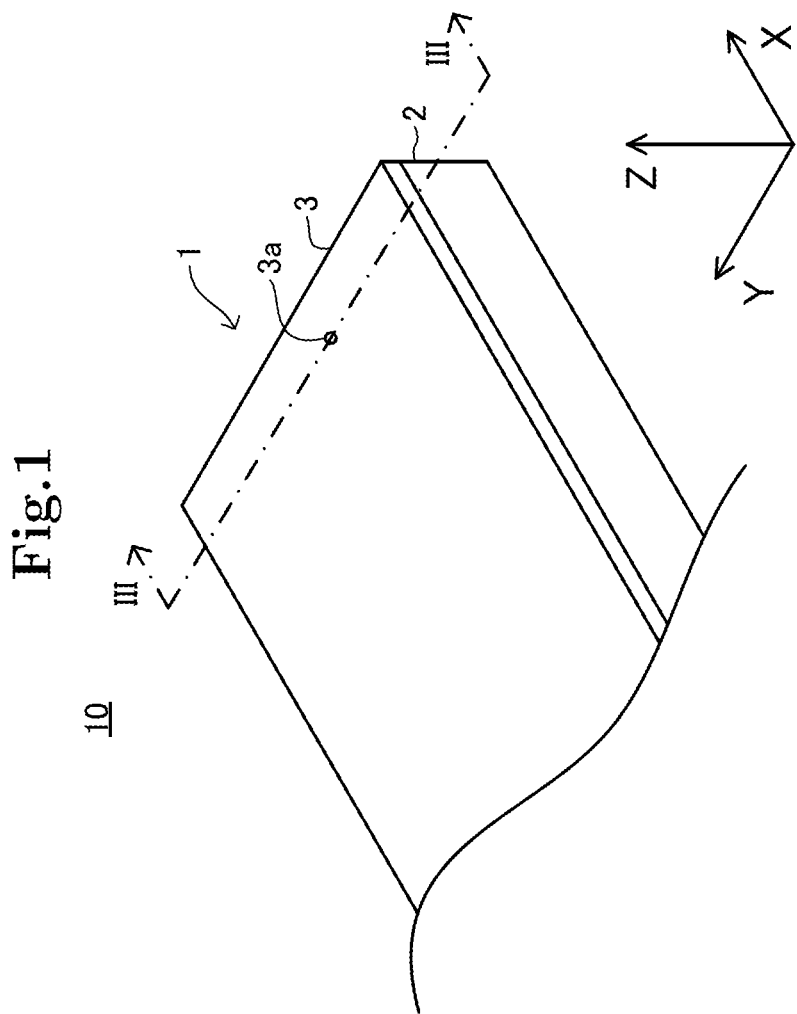
FIG. 1 is a perspective view showing part of an electronic device according to a first exemplary embodiment of the present invention.

As shown in FIG. 1, an electronic device 10 according to a first exemplary embodiment is equipped with a housing 1. The housing 1 is formed like a rectangular parallelepiped. The housing 1 has a sealed structure. In this exemplary embodiment, the electronic device 10 is a mobile phone. The housing 1 includes a base part 2 and a surface part 3. Below, a description will be continued using the right-handed Cartesian coordinate system composed of the x-axis, the y-axis and the z-axes.

As shown in FIG. 1, the base part 2 is formed like a rectangular parallelepiped. The base part 2 configures a portion on the negative side in the z-axis direction of the housing 1. The surface part 3 is formed like a flat board. The surface part 3 configures a portion on the positive side in the z-axis direction of the housing 1. The surface part 3 is placed so as to be laminated on the base part 2 in the z-axis direction.

The surface part 3 is provided with a pierced hole 3a pierced in the z-axis direction. The pierced hole 3a configures an opening that opens to the outside of the housing 1. The pierced hole (the opening) 3a is located in a middle part in the y-axis direction, of an end part on the positive side in the x-axis direction of the surface part 3.

Figure 2:
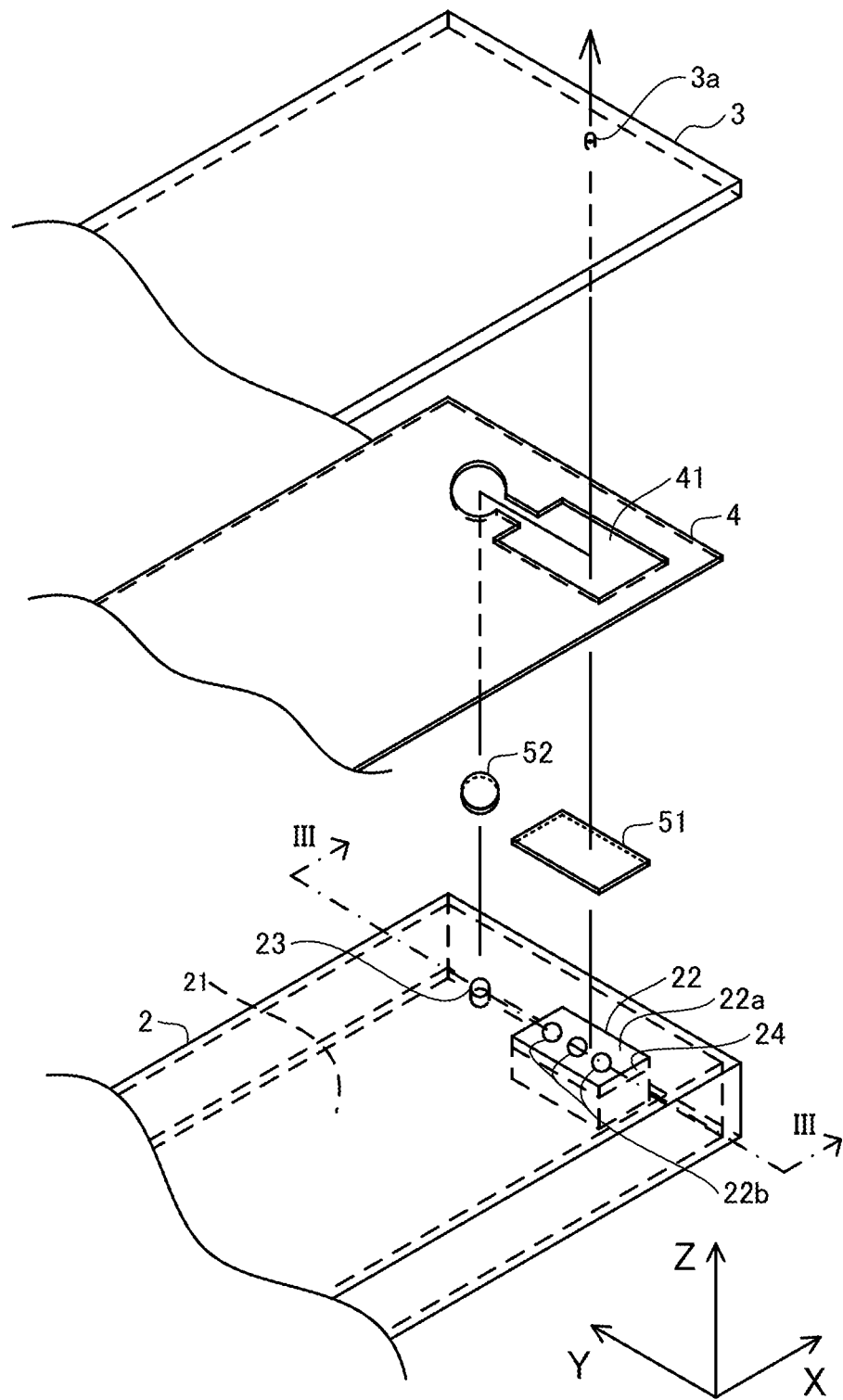
FIG. 2 is an exploded perspective view of the electronic device shown in FIG. 1.
Figure 3:
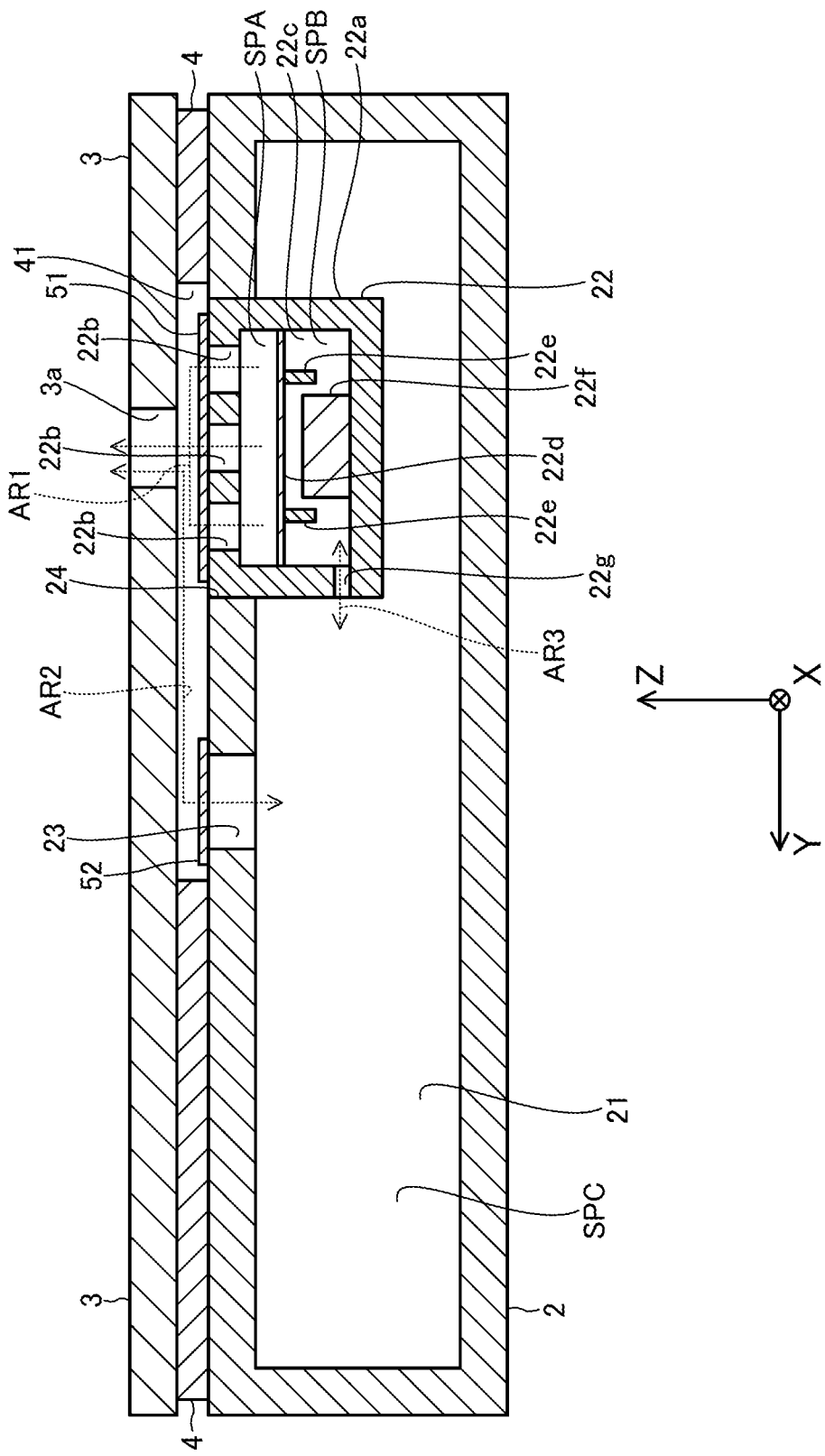
FIG. 3 is a cross-sectional view of the electronic device taken on line III-III of FIGS. 1 and 2.

As shown in FIG. 2, which is an exploded perspective view of the housing 1, an internal space 21 formed like a rectangular parallelepiped is formed inside the base part 2. Moreover, as shown in FIG. 3, which is a cross-sectional view of the housing 1 taken on line III-III of FIGS. 1 and 2, and also as shown in FIG. 2, a first opening 23 and a second opening 24 that open to the outside of the base part 2 are formed on the surface on the positive side in the z-axis direction of the base part 2. The first opening 23 makes the internal space 21 and a space outside the base part 2 communicate with each other. Likewise, the second opening 24 makes the internal space 21 and a space outside the base part 2 communicate with each other.

The first opening 23 has a circular shape. The second opening 24 has a rectangular shape having long sides extending in a direction along the y-axis and short sides extending in a direction along the x-axis.

Further, the electronic device 10 is equipped with a signal converter 22 formed like a rectangular parallelepiped. In this exemplary embodiment, the signal converter 22 is a receiver unit. That is to say, when an electric signal is inputted, the signal converter 22 converts the inputted electric signal into an acoustic signal (an acoustic wave).

The signal converter 22 is equipped with a housing 22a. The housing 22a has substantially the same shape as the second opening 24 in a front view of the electronic device 10 seen toward the negative side in the z-axis direction. The housing 22a is fitted in the second opening 24. The surface on the positive side in the z-axis direction of the housing 22a is placed so as to be located in the same plane as the surface on the positive side in the z-axis direction of the base part 2. That is to say, the signal converter 22 is held in the internal space 21. In this exemplary embodiment, a portion other than the signal converter 22 of the internal space 21 is also referred to as a remaining internal space SPC.

On the surface on the positive side in the z-axis direction of the housing 22a, a plurality of (in this exemplary embodiment, three) openings 22b that open to the outside of the signal converter 22 are formed. Moreover, inside the housing 22a, an internal space 22c formed like a rectangular parallelepiped is formed. The respective openings 22b make the internal space 22c (a front-side space SPA, which will be described later) communicate with a space outside the signal converter 22.

Furthermore, the signal converter 22 includes a diaphragm 22d, a coil 22e and a magnet 22f. The end parts of the diaphragm 22d are retained by the inner wall face of the housing 22a. The diaphragm 22d is placed so as to divide the internal space 22c on the z-axis. In this description, the surface on the positive side in the z-axis direction of the diaphragm 22d is also referred to as a front face. Moreover, the surface on the negative side in the z-axis direction of the diaphragm 22d is also referred to as a back face.

Of the internal space 22c, a portion on the positive side in the z-axis direction with reference to the diaphragm 22d is also referred to as a front-side space SPA. Of the internal space 22c, a portion on the negative side in the z-axis direction with reference to the diaphragm 22d is also referred to as a back-side space SPB.

The coil 22e is fixed to the surface on the negative side in the z-axis direction of the diaphragm 22d. The magnet 22f is fixed to a portion on the negative side in the z-axis direction of the inner wall face of the housing 22a. The magnet 22f is placed so that an end part on the positive side in the z-axis direction of the magnet 22f is surrounded by the coil 22e.

The signal converter 22 is configured so that an electric signal can be inputted. The signal converter 22 applies electric current corresponding to the inputted electric signal to the coil 22e. Thus, the coil 22e is driven in the z-axis direction. As a result, the diaphragm 22d vibrates. Consequently, the signal converter 22 generates an acoustic signal (an acoustic wave).

Thus, the coil 22e and the magnet 22f configure a driving part that causes the diaphragm 22d to vibrate based on an electric signal inputted into the signal converter 22. That is to say, the coil 22e configuring part of the driving part is disposed to the back face of the diaphragm 22d.

Further, on the surface on the positive side in the y-axis direction of the housing 22a, an opening 22g is formed. The opening 22g is placed at an end part on the negative side in the z-axis direction of the signal converter 22. The opening 22g makes the back-side space SPB communicate with the outside of the signal converter 22. With such a configuration, the opening 22g makes the back-side space SPB communicate with the remaining internal space SPC.

In this exemplary embodiment, the front-side space SPA configures a first division space. Moreover, the back-side space SPB and the remaining internal space SPC configure a second division space.

Furthermore, the electronic device 10 is equipped with a first waterproof membrane 51 and a second waterproof membrane 52.

The first waterproof membrane 51 is a flat member that blocks liquid (i.e., forbids the passing of liquid) and allows the passing of gas. In this exemplary embodiment, the first waterproof membrane 51 is made of GORE-TEX™. The first waterproof membrane 51 is formed like a rectangular having substantially the same size as the signal converter 22, in a front view of the electronic device 10 seen toward the negative side in the z-axis direction. The first waterproof membrane 51 is fixed to the surface on the positive side in the z-axis direction of the base part 2 so as to cover all of the openings 22b.

The second waterproof membrane 52 is a flat member that blocks liquid and allows the passing of gas. The second waterproof membrane 52 is formed like a circle having a larger diameter than the first opening 23, in a front view of the electronic device 10 seen toward the negative side in the z-axis direction. The second waterproof membrane 52 is fixed to the surface on the positive side in the z-axis direction of the base part 2 so as to cover the first opening 23.

In addition, the electronic device 10 is equipped with an adhesive sheet 4. The adhesive sheet 4 is a flat member. The surface of the adhesive sheet 4 is coated with an adhesive. The adhesive sheet 4 has substantially the same shape as the base part 2 and the surface part 3, in a front view of the electronic device 10 seen toward the negative side in the z-axis direction.

The adhesive sheet 4 is provided with a pierced hole 41 pierced in the z-axis direction. The pierced hole 41 is formed so as to hold both the first waterproof membrane 51 and the second waterproof membrane 52 and so as to adjoin the pierced hole 3a. The adhesive sheet 4 is inserted into between the base part 2 and the surface part 3. That is to say, the base part 2 and the surface part 3 are fixed to each other by the adhesive sheet 4 sandwiched therebetween.

With such a configuration, the opening 22b and the pierced hole 41 configure a first communicating path that makes the first division space communicate with the pierced hole 3a. Moreover, the first opening 23 and the pierced hole 41 configure a second communicating path that makes the second division space communicate with the pierced hole 3a.

Further, the housing 22a and the diaphragm 22d configure a bulkhead that divides the internal space 21 into the first division space and the second division space. The front face of the diaphragm 22d adjoins the first division space. On the other hand, the back face of the diaphragm 22d adjoins the second division space.

Further, the first waterproof membrane 51 blocks liquid and allows the passing of gas in the first communicating path. Likewise, the second waterproof membrane 52 blocks liquid and allows the passing of gas in the second communicating path.

Next, an operation of the electronic device 10 configured as described above will be explained.

The electronic device 10 inputs an electric signal into the signal converter 22. The signal converter 22 applies electric current corresponding to the inputted electric signal to the coil 22e. Thus, the coil 22e is driven in the z-axis direction. As a result, the diaphragm 22d vibrates. Consequently, the signal converter 22 generates an acoustic signal (an acoustic wave).

The acoustic signal generated by the signal converter 22 is propagated from the first division space to the outside of the housing 1 through the first communicating path as shown by arrow AR1 of FIG. 3. Thus, since the first division space adjoining the diaphragm 22d and the pierced hole 3a communicate with each other, secure propagation of an acoustic signal between the signal converter 22 and the outside of the housing 1 is achieved.

Further, when the pressure inside the second division space becomes higher than the pressure outside the housing 1, the air inside the second division space flows out of the second division space to the outside of the housing 1 through the second communicating path as shown by arrow AR2 and arrow AR3 of FIG. 3. On the other hand, when the pressure inside the second division space becomes lower than the pressure outside the housing 1, the air outside the housing 1 flows into the second division space from outside the housing 1 through the second communicating path as shown by arrow AR2 and arrow AR3 of FIG. 3.

Consequently, resistance to the diaphragm 22d at the time of vibration, which is caused by variation of the pressure inside the back-side space SPB due to the vibrations of the diaphragm 22d, can be smaller than in a case that the space adjoining the back face of the diaphragm 22d is sealed.

Furthermore, it is possible to bring the pressure inside the second division space close to the pressure outside the housing 1. That is to say, it is possible to regulate the pressure inside the second division space. Consequently, it is possible to prevent the housing 1 from being damaged by an excessively large difference between the pressure inside the second division space and the pressure outside the housing 1.

Further, in a case that liquid flows into the housing 1 through the pierced hole 3a, the liquid having flown in is blocked by the first waterproof membrane 51 and the second waterproof membrane 52. Thus, it is possible to prevent liquid from flowing into the base part 2.

As described above, according to the first exemplary embodiment of the present invention, it is possible to reduce the number of the openings formed on the surface part 3. As a result, it is possible to increase the freedom of design of the surface part 3. Moreover, since the first division space adjoining the diaphragm 22d communicates with the pierced hole 3a, secure propagation of an acoustic signal between the signal converter 22 and the outside of the housing 1 is achieved.

Further, in the first exemplary embodiment, a space (the second division space) adjoining the back face of the diaphragm 22d adjoins the outside of the housing 1. Accordingly, resistance to the diaphragm 22d at the time of vibration becomes smaller than in a case that the space adjoining the back face of the diaphragm 22d is sealed. As a result, it is possible to perform conversion between an acoustic signal and an electric signal with high accuracy.

In addition, in the first exemplary embodiment, the electronic device 10 is equipped with the first waterproof membrane 51 and the second waterproof membrane 52. Accordingly, it is possible to allow propagation of an acoustic signal and prevent entering of liquid into the housing 1.

Figure 4:
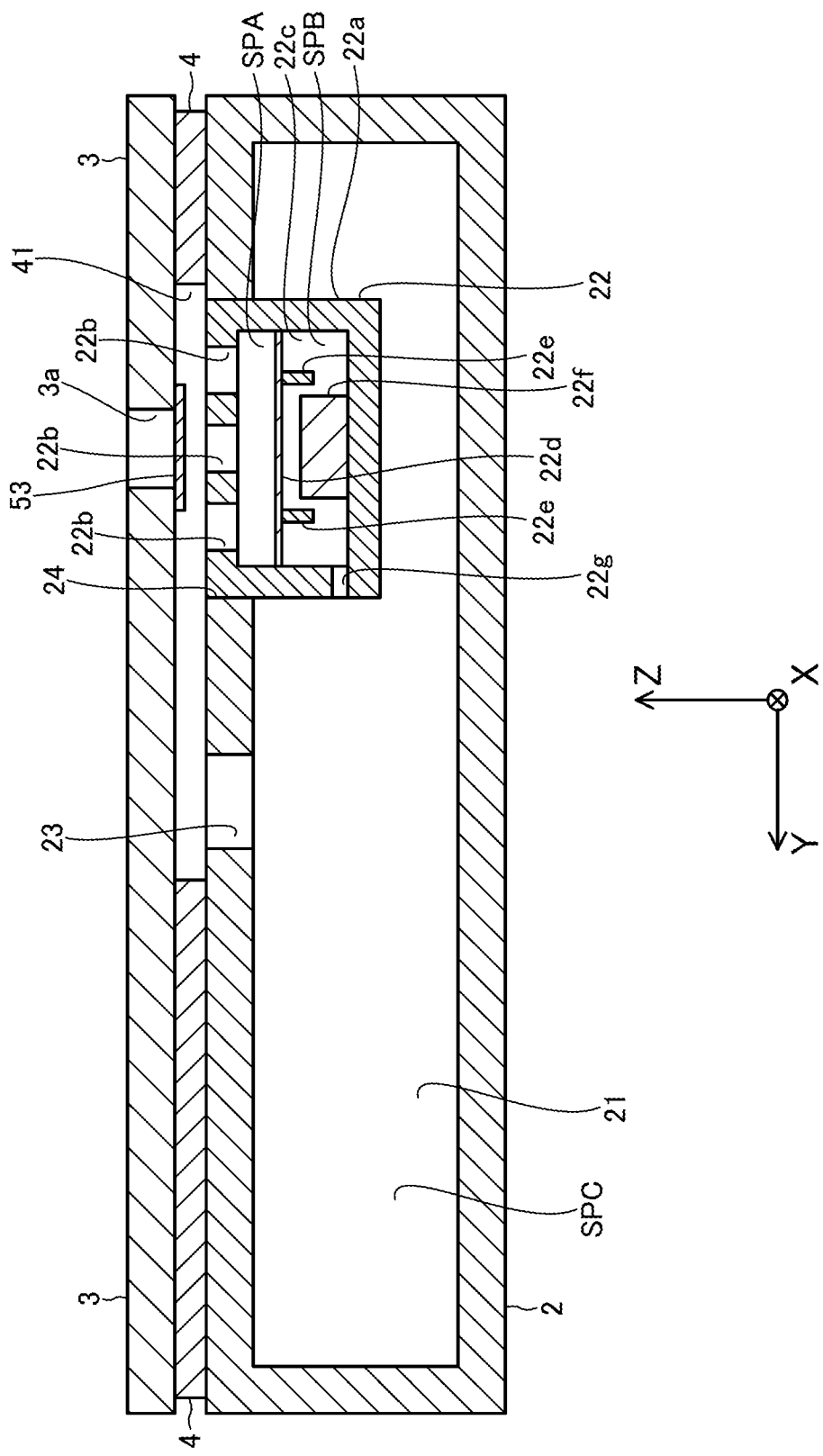
FIG. 4 is a cross-sectional view of the electronic device according to a first modified example of the first exemplary embodiment of the present invention.

The electronic device 10 according to a first modified example of the first exemplary embodiment is equipped with a waterproof membrane 53, instead of the first waterproof membrane 51 and the second waterproof membrane 52, as shown in FIG. 4.

The waterproof membrane 53 is a flat member that blocks liquid and allows the passing of gas. The waterproof membrane 53 is formed like a circle having a larger diameter than the pierced hole 3a, in a front view of the surface part 3 seen toward the positive side in the z-axis direction. The waterproof membrane 53 is fixed to the surface on the negative side in the z-axis direction of the surface part 3 so as to cover the pierced hole 3a.

This first modified example can also produce the same actions and effects as in the first exemplary embodiment. Moreover, according to the first modified example, it is possible to reduce the number of the waterproof membranes.

Further, in another modified example of the first exemplary embodiment, the electronic device 10 does not need to be necessarily equipped with the first waterproof membrane 51 and the second waterproof membrane 52.

<Second Exemplary Embodiment>

Next, an electronic device according to a second exemplary embodiment of the present invention will be described. The electronic device according to the second exemplary embodiment is different from the electronic device according to the first exemplary embodiment in that the internal space 21 of the housing 1 is divided into three spaces. Therefore, a description will be made focusing on the different point.

Figure 5:
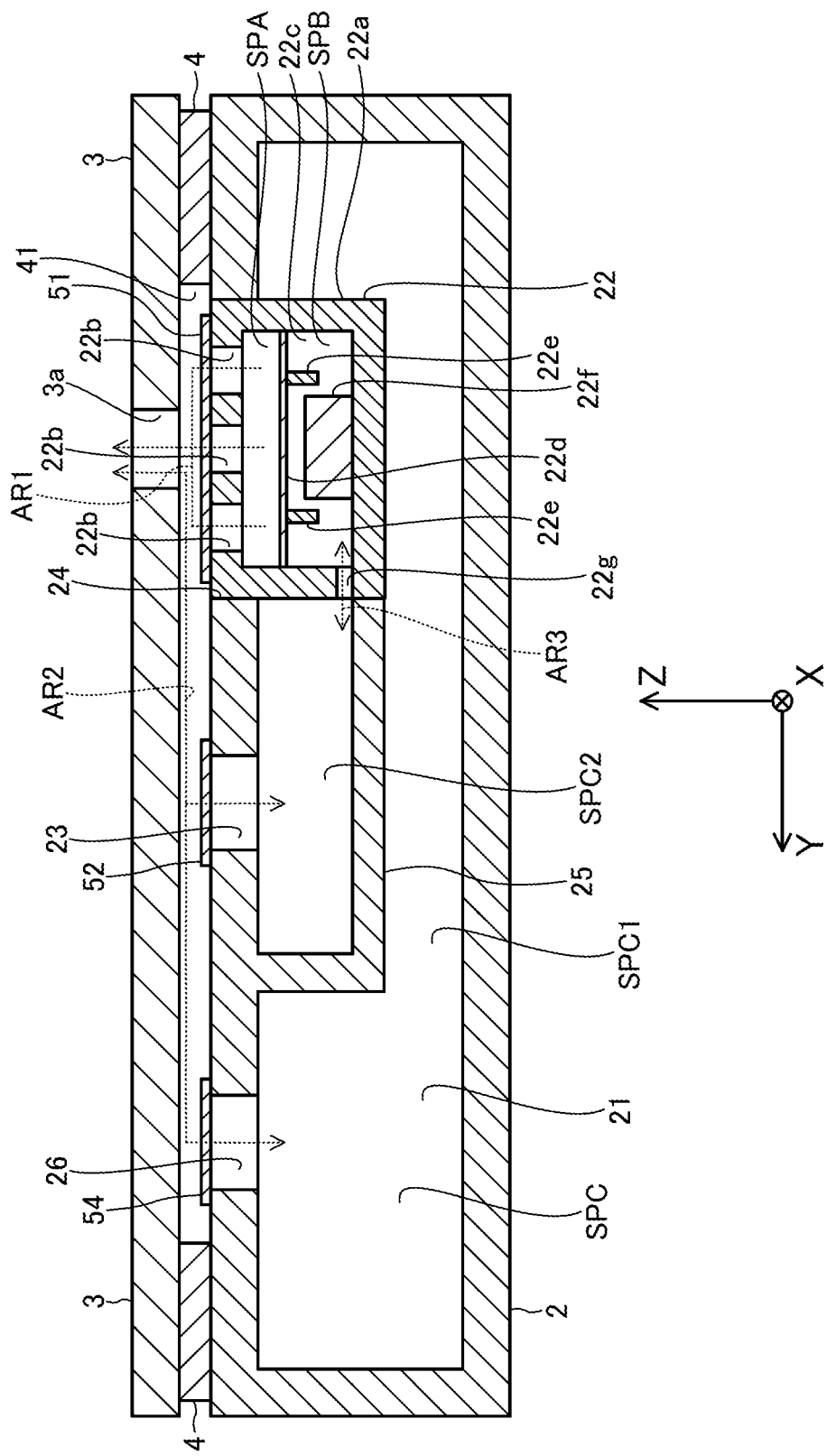
FIG. 5 is a cross-sectional view of an electronic device according to a second exemplary embodiment of the present invention.

The base part 2 in the second exemplary embodiment has a bulkhead 25 as shown in FIG. 5. The bulkhead 25 divides the remaining internal space SPC into a first remaining internal space SPC1 and a second remaining internal space SPC2. The second remaining internal space SPC2 adjoins the opening 22g and the first opening 23.

Further, the surface on the positive side in the z-axis direction of the base 2 is provided with a third opening 26 that opens to the outside of the base part 2, in addition to the first opening 23 and the second opening 24. The third opening 26 makes the first remaining internal space SPC1 communicate with a space outside the base part 2. The third opening 26 has a circular shape.

In this exemplary embodiment, the front-side space SPA configures the first division space. The back-side space SPB and the second remaining internal space SPC configure the second division space. The first remaining internal space SPC1 configures a third division space.

Furthermore, the electronic device 10 is equipped with a third waterproof membrane 54.

The third waterproof membrane 54 is a flat member that blocks liquid and allows the passing of gas. The third waterproof membrane 54 is formed like a circle having a larger diameter than the third opening 26, in a front view of the electronic device 10 seen toward the negative side in the z-axis direction. The third waterproof membrane 54 is fixed to the surface on the positive side in the z-axis direction of the base part 2 so as to cover the third opening 26.

The pierced hole 41 is formed so as to hold all of the first, second and third waterproof membranes 51, 52 and 54 and so as to adjoin the pierced hole 3a.

With such a configuration, the opening 22b and the pierced hole 41 configure the first communicating path that makes the first division space communicate with the pierced hole 3a. The first opening 23 and the pierced hole 41 configure the second communicating path that makes the second division space communicate with the pierced hole 3a. Moreover, the third opening 26 and the pierced hole 41 configure a third communicating path that makes the third division space communicate with the pierced hole 3a.

According to the electronic device 10 of the second exemplary embodiment, as in the first exemplary embodiment described above, it is possible to reduce the number of the openings formed on the surface part 3. As a result, it is possible to increase the freedom of design of the surface part 3. Moreover, since the first division space adjoining the diaphragm 22d and the pierced hole 3a communicate with each other, secure propagation of an acoustic signal between the signal converter 22 and the outside of the housing 1 is achieved.

Furthermore, in the second exemplary embodiment, a space (the second division space) adjoining the back face of the diaphragm 22d adjoins the outside of the housing 1 as in the first exemplary embodiment. Accordingly, resistance to the diaphragm 22d at the time of vibration becomes smaller than in a case that the space adjoining the back face of the diaphragm 22d is sealed. As a result, it is possible to perform conversion between an acoustic signal and an electric signal with high accuracy.

Besides, in the second exemplary embodiment, the third division space adjoins the outside of the housing 1. Accordingly, it is possible to bring the pressure inside the third division space close to the pressure outside the housing 1. That is to say, it is possible to regulate the pressure inside the third division space. Consequently, it is possible to prevent the housing 1 from being damaged by an excessively large difference between the pressure inside the third division space and the pressure outside the housing 1.

In addition, in the second exemplary embodiment, the electronic device 10 is equipped with the first waterproof membrane 51, the second waterproof membrane 52, and the third waterproof membrane 54. Accordingly, it is possible to allow propagation of an acoustic signal and prevent entering of liquid into the housing 1.

Figure 6:
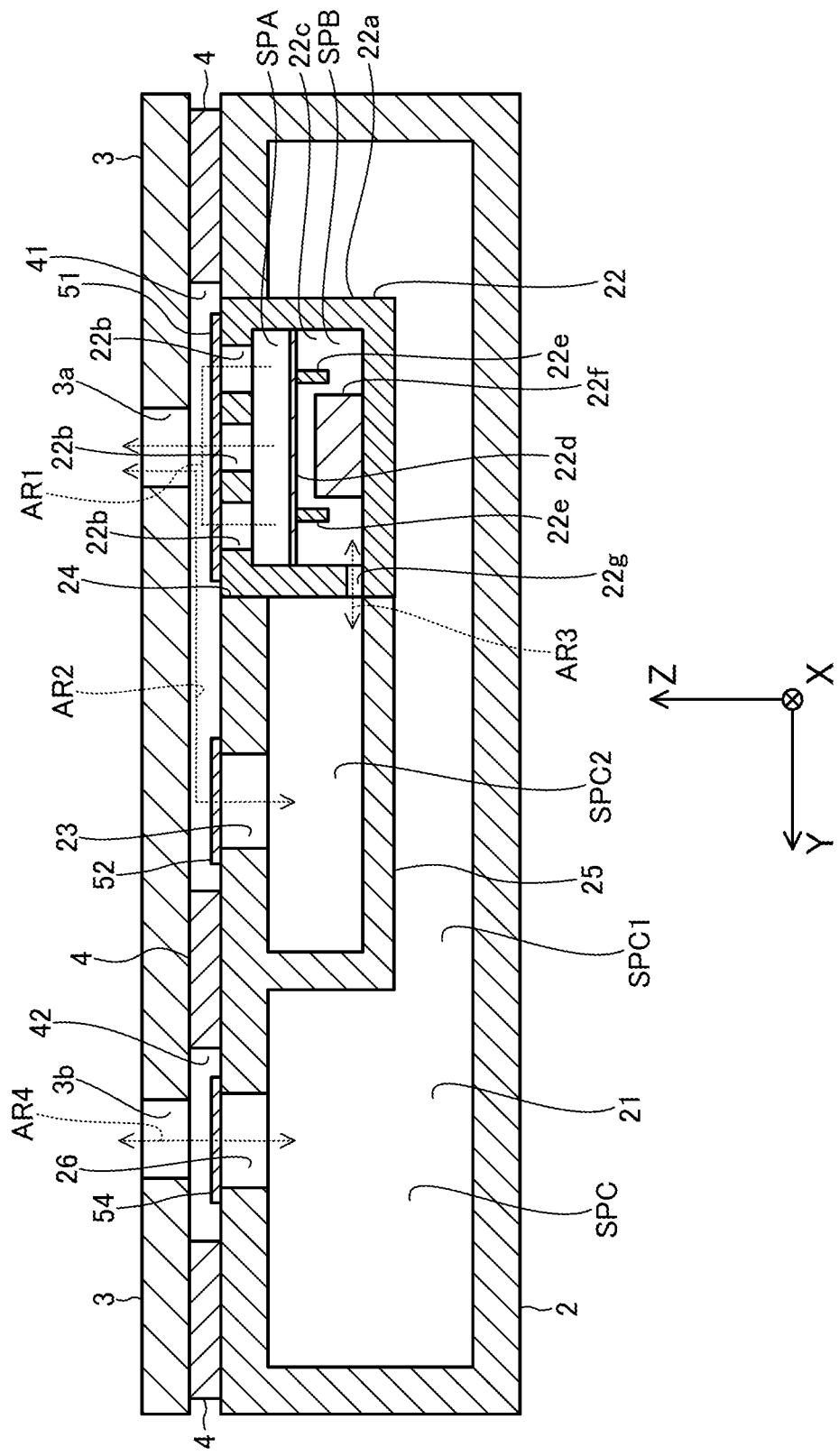
FIG. 6 is a cross-sectional view of the electronic device according to a first modified example of the second exemplary embodiment of the present invention.

As shown in FIG. 6, the surface part 3 of the electronic device 10 according to a first modified example of the second exemplary embodiment is provided with a pierced hole 3b pierced in the z-axis direction, in addition to the pierced hole 3a. The pierced hole 3b configures an opening that opens to the outside of the housing 1. The pierced hole (the opening) 3b is located on the positive side in the y-axis direction with reference to the pierced hole 3a.

The adhesive sheet 4 is provided with, in addition to the pierced hole 41, a pierced hole 42 pierced in the z-axis direction. In this exemplary embodiment, the pierced hole 41 is formed so as to hold both the first waterproof membrane 51 and the second waterproof membrane 52 and so as to adjoin the pierced hole 3a. The pierced hole 42 is formed so as to hold the third waterproof membrane 54 and so as to adjoin the pierced hole 3b.

With such a configuration, the third opening 26 and the pierced hole 42 configure a fourth communicating path that makes the third division space communicate with the pierced hole 3b. That is to say, in this first modified example, when the pressure inside the third division space becomes higher than the pressure outside the housing 1, the air inside the third division space flows out of the third division space to the outside of the housing 1 through the fourth communicating path as shown by arrow AR4 of FIG. 6. On the other hand, when the pressure inside the third division space becomes lower than the pressure outside the housing 1, the air outside the housing 1 flows into the third division space from outside the housing 1 through the fourth communicating path as shown by arrow AR4 of FIG. 6.

This first modified example can also produce the same actions and effects as in the second exemplary embodiment.

<Third Exemplary Embodiment>

Next, an electronic device according to a third exemplary embodiment of the present invention will be described. The electronic device according to the third exemplary embodiment is different from the electronic device according to the first exemplary embodiment in that the internal space 21 of the housing 1 is divided into three spaces, and in that an opening of the housing 1 adjoining a space adjoining the front face of the diaphragm 22d and an opening of the housing 1 adjoining a space adjoining the back face of the diaphragm 22d are different from each other. Therefore, a description will be made focusing on the difference point.

Figure 7:
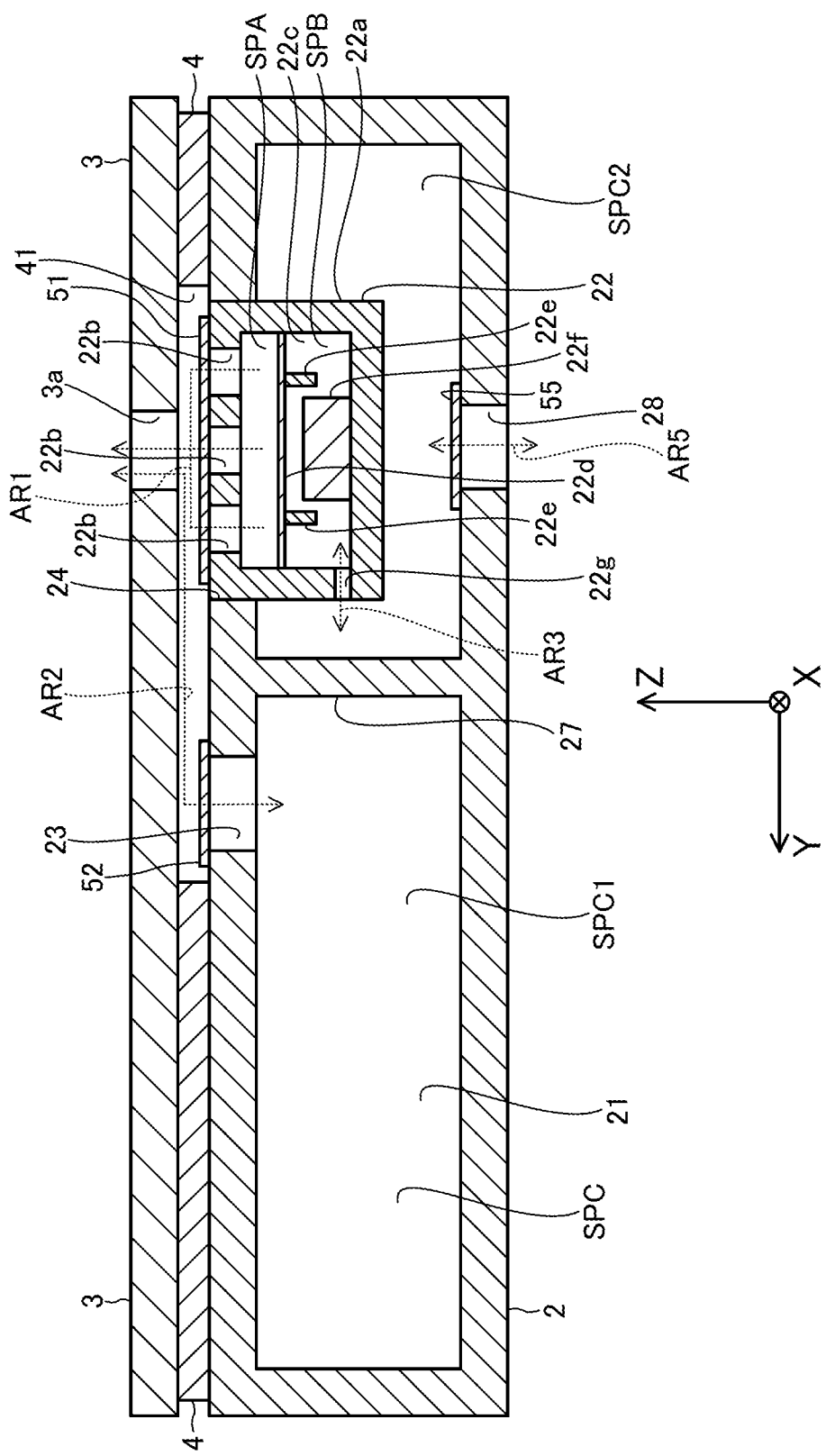
FIG. 7 is a cross-sectional view of an electronic device according to a third exemplary embodiment of the present invention.

The base part 2 in the third exemplary embodiment has a bulkhead 27 as shown in FIG. 7. The bulkhead 27 divides the remaining internal space SPC into the first remaining internal space SPC1 and the second remaining internal space SPC2 on the y-axis. The first remaining internal space SPC1 adjoins the first opening 23.

Further, the surface on the negative side in the z-axis direction of the base part 2 is provided with a fourth opening 28 that opens to the outside of the base part 2. The fourth opening 28 makes the second remaining internal space SPC2 communicate with a space outside the base part 2. The fourth opening 28 has a circular shape.

In this exemplary embodiment, the front-side space SPA configures the first division space. The first remaining internal space SPC1 configures the second division space. The back-side space SPB and the second remaining internal space SPC2 configure the third division space.

That is to say, the housing 22a and the diaphragm 22d configure part of a bulkhead forming the first division space. Moreover, the housing 22a and the diaphragm 22d configure part of a bulkhead forming the third division space. Furthermore, the front face of the diaphragm 22d adjoins the first division space. On the other hand, the back face of the diaphragm 22d adjoins the third division space.

Furthermore, the electronic device 10 is equipped with a third waterproof membrane 55.

The third waterproof membrane 55 is a flat member that blocks liquid and allows the passing of gas. The third waterproof membrane 55 is formed like a circle having a larger diameter than the fourth opening 28, in a front view of the base part 2 seen toward the negative side in the z-axis direction. The third waterproof membrane 55 is fixed to the inner wall face on the negative side in the z-axis direction of the inner wall face of the base part 2 so as to cover the fourth opening 28.

With such a configuration, the opening 22b and the pierced hole 41 configure a first communicating path that makes the first division space communicate with the pierced hole 3a. Moreover, the first opening 23 and the pierced hole 41 configure a second communicating path that makes the second division space communicate with the pierced hole 3a.

Also in this third exemplary embodiment, an acoustic signal generated by the signal converter 22 is propagated from the first division space to the outside of the housing 1 through the first communicating path as shown by arrow AR1 of FIG. 7. Thus, since the first division space adjoining the diaphragm 22d communicate with the pierced hole 3a, secure propagation of an acoustic signal between the signal converter 22 and the outside of the housing 1 is achieved.

Further, when the pressure inside the second division space becomes higher than the pressure outside the housing 1, the air inside the second division space flows out of the second division space to the outside of the housing 1 through the second communicating path as shown by arrow AR2 of FIG. 7. On the other hand, when the pressure inside the second division space becomes lower than the pressure outside the housing 1, the air outside the housing 1 flows into the second division space from the outside of the housing 1 through the second communicating path as shown by arrow AR2 of FIG. 7.

Thus, it is possible to bring the pressure inside the second division space close to the pressure outside the housing 1. That is to say, it is possible to regulate the pressure inside the second division space. Accordingly, it is possible to prevent the housing 1 from being damaged by an excessively large difference between the pressure inside the second division space and the pressure outside the housing 1.

Further, when the pressure inside the third division space becomes higher than the pressure outside the housing 1, the air inside the third division space flows to the outside of the housing 1 from the third division space through the fourth opening 28 as shown by arrow AR3 and arrow AR5 of FIG. 7. On the other hand, when the pressure inside the third division space becomes lower than the pressure outside the housing 1, the air outside the housing 1 flows into the third division space from outside of the housing 1 through the fourth opening 28 as shown by arrow AR3 and arrow AR5 of FIG. 7.

Thus, resistance to the diaphragm 22d at the time of vibration, which is caused by variation of the pressure inside the back-side space SPB due to the vibrations of the diaphragm 22d, can be smaller than in a case that the space adjoining the back face of the diaphragm 22d is sealed.

Further, in a case that liquid flows into the housing 1 through the pierced hole 3a or the fourth opening 28, the liquid having flown in is blocked by the first waterproof membrane 51 and the second waterproof membrane 52 or by the third waterproof membrane 55. Thus, it is possible to prevent liquid from flowing into the base part 2.

Thus this third exemplary embodiment can also produce the same actions and effects as in the first exemplary embodiment.

<Fourth Exemplary Embodiment>

Next, an electronic device according to a fourth exemplary embodiment of the present invention will be described with reference to FIG. 8.

An electronic device 100 according to the fourth exemplary embodiment is equipped with a signal converter 110 and a housing 120.

The signal converter 110 has a diaphragm 111 and, when one of an acoustic signal and an electric signal is inputted, converts the inputted signal into the other signal by vibrations of the diaphragm 111.

The housing 120 is provided with an internal space SPD. Further, the housing 120 holds the signal converter 110 in the internal space SPD.

The housing 120 is provided with an opening 121 that opens to an outside of the housing 120.

The housing 120 has a bulkhead 122 that divides the internal space SPD into a plurality of division spaces including a first division space SPD1 and a second division space SPD2.

The diaphragm 111 configures at least part of a bulkhead forming the first division space SPD1.

The housing 120 is provided with a first communicating path (a communicating path shown by arrow AR1 in this exemplary embodiment) configured to make the first division space SPD1 and the opening 121 communicate with each other and a second communicating path (a communicating path shown by arrow AR2 in this exemplary embodiment) configured to make the second division space SPD2 and the opening 121 communicate with each other.

This enables reduction of the number of the openings formed on the housing 120. As a result, it is possible to increase the freedom of design of the housing 120. Moreover, since the first division space SPD1 adjoining the diaphragm 111 communicates with the opening 121, it is possible to securely propagate an acoustic signal between the signal converter 110 and the outside of the housing 120.

In this case, it is preferred that the diaphragm configures at least part of the bulkhead forming the first division space and also configures at least part of a bulkhead forming the second division space, and a front face that is one face of the diaphragm is configured to adjoin the first division space and a back face that is the other face of the diaphragm is configured to adjoin the second division space.

This makes the resistance to the diaphragm at the time of vibration smaller than in a case that a space adjoining the back face of the diaphragm is sealed. As a result, it is possible to perform conversion between an acoustic signal and an electric signal with higher accuracy.

In this case, it is preferred that:
the plurality of division spaces further include a third division space; and
the housing is further provided with a third communicating path configured to make the third division space and the opening communicate with each other.

This makes it possible to being the pressure inside the third division space close to the pressure outside the housing. That is to say, it is possible to regulate the pressure inside the third division space. Consequently, it is possible to prevent the housing from being damaged by an excessively large difference between the pressure inside the internal space and the pressure outside the housing.

Further, it is preferred that:
the plurality of division spaces further include a third division space; and
the diaphragm configures at least part of the bulkhead forming the first division space and also configures at least part of a bulkhead forming the third division space, and a front face that is one face of the diaphragm is configured to adjoin the first division space and a back face that is the other face of the diaphragm is configured to adjoin the third division space.

This makes it possible to being the pressure inside the third division space close to the pressure outside the housing. That is to say, it is possible to regulate the pressure inside the third division space. Consequently, it is possible to prevent the housing from being damaged by an excessively large difference between the pressure inside the internal space and the pressure outside the housing.

In this case, it is preferred that:
the housing has a sealed structure; and
a waterproof membrane configured to block liquid and allow passing of gas in the communicating path is disposed.

This allows propagation of an acoustic signal and makes it possible to prevent entering of liquid into the housing.

In this case, it is preferred that:
the signal converter is equipped with a driving part configured to, when the electric signal is inputted, cause the diaphragm to vibrate based on the inputted electric signal;
at least part of the driving part is disposed to a back face that is one face of the diaphragm; and
the diaphragm is configured so that a front face that is an opposite face to the back face of the diaphragm adjoins the first division space.

Further, in another aspect of the electronic device, it is preferred that:
the signal converter is equipped with a detection part configured to, when the acoustic signal is inputted, detect vibration quantity of the diaphragm corresponding to the inputted acoustic signal;
at least part of the detection part is disposed to a back face that is one face of the diaphragm; and
the diaphragm is configured so that a front face that is an opposite face to the back face of the diaphragm adjoins the first division space.

Further, a mobile phone of another exemplary embodiment includes:
a signal converter provided with a diaphragm and configured to, when one of an acoustic signal and an electric signal is inputted, convert the inputted signal into the other signal by vibrations of the diaphragm; and
a housing provided with an internal space and configured to hold the signal converter in the internal space.

In the mobile phone:
the housing is provided with an opening configured to open to an outside of the housing;
the housing has a bulkhead configured to divide the internal space into a plurality of division spaces including a first division space and a second division space;
the diaphragm configures at least part of a bulkhead forming the first division space; and
the housing is provided with a first communicating path configured to make the first division space and the opening communicate with each other and a second communicating path configured to make the second division space and the opening communicate with each other.

In this case, it is preferred that the diaphragm configures at least part of the bulkhead forming the first division space and also configures at least part of a bulkhead forming the second division space, and a front face that is one face of the diaphragm is configured to adjoin the first division space and a back face that is the other face of the diaphragm is configured to adjoin the second division space.

In this case, it is preferred that:
the plurality of division spaces further include a third division space; and
the housing is further provided with a third communicating path configured to make the third division space and the opening communicate with each other.

Further, in a mobile phone according to another aspect of the present invention, it is preferred that:
the plurality of division spaces further include a third division space; and
the diaphragm configures at least part of the bulkhead forming the first division space and also configures at least part of a bulkhead forming the third division space, and a front face that is one face of the diaphragm is configured to adjoin the first division space and a back face that is the other face of the diaphragm is configured to adjoin the third division space.

Further, a signal propagating method of another exemplary embodiment of the present invention is a method applied to an electronic device.

The electronic device includes: a signal converter provided with a diaphragm and configured to, when one of an acoustic signal and an electric signal is inputted, convert the inputted signal into the other signal by vibrations of the diaphragm; and a housing provided with an internal space and configured to hold the signal converter in the internal space.

The electronic device is configured so that: the housing has a bulkhead configured to divide the internal space into a plurality of division spaces including a first division space and a second division space; and the diaphragm configures at least part of a bulkhead forming the first division space.

The signal propagating method includes:
performing propagation of the acoustic signal between the first division space and an outside of the housing through a first communicating path formed so as to make an opening formed so as to open to the outside of the housing and the first division space communicate with each other; and
making air pass through a second communicating path formed so as to make the opening and the second division space communicate with each other.

In this case, it is preferred that the diaphragm configures at least part of the bulkhead forming the first division space and also configures at least part of a bulkhead forming the second division space, and a front face that is one face of the diaphragm is configured to adjoin the first division space and a back face that is the other face of the diaphragm is configured to adjoin the second division space.

In this case, it is preferred that the plurality of division spaces further include a third division space and the signal propagating method includes making the air pass through a third communicating path formed so as to make the opening and the third division space communicate with each other.

Further, in a signal propagating method according to another aspect of the present invention, it is preferred that:
the plurality of division spaces further include a third division space; and
the diaphragm configures at least part of the bulkhead forming the first division space and also configures at least part of a bulkhead forming the third division space, and a front face that is one face of the diaphragm is configured to adjoin the first division space and a back face that is the other face of the diaphragm is configured to adjoin the third division space.

Inventions of a mobile phone and a signal propagation method having the configurations described above also have the same actions as the electronic devices described above, and therefore, can achieve the abovementioned object of the present invention.

Although the present invention has been described above with reference to the exemplary embodiments, the present invention is not limited to the exemplary embodiments. The configurations and details of the present invention can be altered in various manners that can be understood by those skilled in the art within the scope of the present invention.

For example, the signal converter 22 is a receiver unit in the respective exemplary embodiments described above, but the signal converter 22 may be a speaker unit. Moreover, the signal converter 22 may be a microphone unit that, when an acoustic signal is inputted, converts the inputted acoustic signal into an electronic signal by the vibrations of a diaphragm. In this case, the coil 22e and the magnet 22f configure a detection part that, when an acoustic signal is inputted into the signal converter 22, detects the vibration quantity of the diaphragm 22d corresponding to the inputted acoustic signal.

Further, the electronic device 10 is a mobile phone in the respective exemplary embodiments described above, but the electronic device 10 may be a personal computer, a PHS (Personal Handyphone System), a PDA (Personal Data Assistance, Personal Digital Assistant), a car navigation system, an acoustic device, a game machine, or the like.

Further, as another modified example of each of the exemplary embodiments, any combination of the exemplary embodiment and the modified example described above may be employed.

The present invention is based upon and claims the benefit of priority from Japanese patent application No. 2009-237823, filed on Oct. 15, 2009, the disclosure of which is incorporated herein in its entirety by reference.

INDUSTRIAL APPLICABILITY

The present invention can be applied to, for example, a mobile phone having a waterproof function.

DESCRIPTION OF REFERENCE NUMERALS 1 housing
2 base part
3 surface part
3a pierced hole (opening)
3b pierced hole (opening)
4 adhesive sheet
10 electronic device
21 internal space
22 signal converter
22a housing
22b opening
22c internal space
22d diaphragm
22e coil
22f magnet
22g opening
23 first opening
24 second opening
25 bulkhead
26 third opening
27 bulkhead
28 fourth opening
41 pierced hole
42 pierced hole
51 first waterproof membrane
52 second waterproof membrane
53 waterproof membrane
54 third waterproof membrane
55 third waterproof membrane
100 electronic device
110 signal converter
111 diaphragm
120 housing
121 opening
122 bulkhead
SPA front-side space
SPB back-side space
SPC remaining internal space
SPC1 first remaining internal space
SPC2 second remaining internal space
SPD internal space
SPD1 first division space
SPD2 second division space

The invention claimed is:

1. An electronic device, comprising:
a signal converter provided with a diaphragm and configured to, when one of an acoustic signal and an electric signal is inputted, convert the inputted signal into the other signal by vibrations of the diaphragm; and
a housing provided with an internal space and configured to hold the signal converter in the internal space, wherein:
the housing is provided with an opening configured to open to an outside of the housing;
the housing has a bulkhead configured to divide the internal space into a plurality of division spaces including a first division space and a second division space;
the diaphragm configures at least part of a bulkhead forming the first division space; and
the housing is provided with a first communicating path configured to make the first division space and the opening communicate with each other and a second communicating path configured to make the second division space and the opening communicate with each other.

2. The electronic device according to claim 1, wherein the diaphragm configures at least part of the bulkhead forming the first division space and also configures at least part of a bulkhead forming the second division space, and a front face that is one face of the diaphragm is configured to adjoin the first division space and a back face that is the other face of the diaphragm is configured to adjoin the second division space.

3. The electronic device according to claim 2, wherein:
the plurality of division spaces further include a third division space; and
the housing is further provided with a third communicating path configured to make the third division space and the opening communicate with each other.

4. The electronic device according to claim 1, wherein:
the plurality of division spaces further include a third division space; and
the diaphragm configures at least part of the bulkhead forming the first division space and also configures at least part of a bulkhead forming the third division space, and a front face that is one face of the diaphragm is configured to adjoin the first division space and a back face that is the other face of the diaphragm is configured to adjoin the third division space.

5. The electronic device according to claim 1, wherein:
the housing has a sealed structure; and
a waterproof membrane configured to block liquid and allow passing of gas in the communicating path is disposed.

6. The electronic device according to claim 1, wherein:
the signal converter is equipped with a driving part configured to, when the electric signal is inputted, cause the diaphragm to vibrate based on the inputted electric signal;
at least part of the driving part is disposed to a back face that is one face of the diaphragm; and
the diaphragm is configured so that a front face that is an opposite face to the back face of the diaphragm adjoins the first division space.

7. The electronic device according to 5 claim 1, wherein:
the signal converter is equipped with a detection part configured to, when the acoustic signal is inputted, detect vibration quantity of the diaphragm corresponding to the inputted acoustic signal;
at least part of the detection part is disposed to a back face that is one face of the diaphragm; and
the diaphragm is configured so that a front face that is an opposite face to the back face of the diaphragm adjoins the first division space.

8. A mobile phone, comprising:
a signal converter provided with a diaphragm and configured to, when one of an acoustic signal and an electric signal is inputted, convert the inputted signal into the other signal by vibrations of the diaphragm; and
a housing provided with an internal space and configured to hold the signal converter in the internal space, wherein:
the housing is provided with an opening configured to open to an outside of the housing;
the housing has a bulkhead configured to divide the internal space into a plurality of division spaces including a first division space and a second division space;
the diaphragm configures at least part of a bulkhead forming the first division space; and
the housing is provided with a first communicating path configured to make the first division space and the opening communicate with each other and a second communicating path configured to make the second division space and the opening communicate with each other.

9. The mobile phone according to claim 8, wherein the diaphragm configures at least part of the bulkhead forming the first division space and also configures at least part of a bulkhead forming the second division space, and a front face that is one face of the diaphragm is configured to adjoin the first division space and a back face that is the other face of the diaphragm is configured to adjoin the second division space.

10. The mobile phone according to claim 9, wherein:
the plurality of division spaces further include a third division space; and
the housing is further provided with a third communicating path configured to make the third division space and the opening communicate with each other.

11. The mobile phone according to claim 8, wherein:
the plurality of division spaces further include a third division space; and
the diaphragm configures at least part of the bulkhead forming the first division space and also configures at least part of a bulkhead forming the third division space, and a front face that is one face of the diaphragm is configured to adjoin the first division space and a back face that is the other face of the diaphragm is configured to adjoin the third division space.

12. A signal propagating method applied to an electronic device,
the electronic device including: a signal converter provided with a diaphragm and configured to, when one of an acoustic signal and an electric signal is inputted, convert the inputted signal into the other signal by vibrations of the diaphragm; and
a housing provided with an internal space and configured to hold the signal converter in the internal space, and the electronic device being configured so that: the housing has a bulkhead configured to divide the internal space into a plurality of division spaces including a first division space and a second division space; and the diaphragm configures at least part of a bulkhead forming the first division space,
the signal propagating method comprising:
performing propagation of the acoustic signal between the first division space and an outside of the housing through a first communicating path formed so as to make an opening formed so as to open to the outside of the housing and the first division space communicate with each other; and
making air pass through a second communicating path formed so as to make the opening and the second division space communicate with each other.

13. The signal propagating method according to claim 12, wherein the diaphragm configures at least part of the bulkhead forming the first division space and also configures at least part of a bulkhead forming the second division space, and a front face that is one face of the diaphragm is configured to adjoin the first division space and a back face that is the other face of the diaphragm is configured to adjoin the second division space.

14. The signal propagating method according to claim 13, wherein the plurality of division spaces further include a third division space, the signal propagating method comprising making the air pass through a third communicating path formed so as to make the opening and the third division space communicate with each other.

15. The signal propagating method according to claim 12, wherein:
the plurality of division spaces further include a third division space; and
the diaphragm configures at least part of the bulkhead forming the first division space and also configures at least part of a bulkhead forming the third division space, and a front face that is one face of the diaphragm is configured to adjoin the first division space and a back face that is the other face of the diaphragm is configured to adjoin the third division space.

16. The electronic device according to claim 2, wherein:
the housing has a sealed structure; and
a waterproof membrane configured to block liquid and allow passing of gas in the communicating path is disposed.

17. The electronic device according to claim 3, wherein:
the housing has a sealed structure; and
a waterproof membrane configured to block liquid and allow passing of gas in the communicating path is disposed.

18. The electronic device according to claim 4, wherein:
the housing has a sealed structure; and
a waterproof membrane configured to block liquid and allow passing of gas in the communicating path is disposed.

19. The electronic device according to claim 2, wherein:

the signal converter is equipped with a driving part configured to, when the electric signal is inputted, cause the diaphragm to vibrate based on the inputted electric signal;

at least part of the driving part is disposed to a back face that is one face of the diaphragm; and the diaphragm is configured so that a front face that is an opposite face to the back face of the diaphragm adjoins the first division space.

20. The electronic device according to claim 3, wherein:

the signal converter is equipped with a driving part configured to, when the electric signal is inputted, cause the diaphragm to vibrate based on the inputted electric signal;

at least part of the driving part is disposed to a back face that is one face of the diaphragm; and the diaphragm is configured so that a front face that is an opposite face to the back face of the diaphragm adjoins the first division space.

* * * * *